US009355771B2

(12) United States Patent
Worek et al.

(10) Patent No.: US 9,355,771 B2
(45) Date of Patent: May 31, 2016

(54) INTEGRATED REACTANCE MODULE

(75) Inventors: Cezary Worek, Cracow (PL); Robert Maslanka, Czestochowa (PL)

(73) Assignee: AKADEMIA GORNICZO-HUTNICZA IM. STANISLAWA STASZICA W KRAKOWIE, Cracow (PL)

( * ) Notice: Subject to any disclaimer, the term of this patent is extended or adjusted under 35 U.S.C. 154(b) by 0 days.

(21) Appl. No.: 13/514,054

(22) PCT Filed: Dec. 13, 2010

(86) PCT No.: PCT/EP2010/069552
§ 371 (c)(1),
(2), (4) Date: Jun. 6, 2012

(87) PCT Pub. No.: WO2011/073156
PCT Pub. Date: Jun. 23, 2011

(65) Prior Publication Data
US 2012/0242445 A1    Sep. 27, 2012

(30) Foreign Application Priority Data
Dec. 14, 2009  (PL) .......................... 389907

(51) Int. Cl.
*H01F 27/28*    (2006.01)
*H01F 17/04*    (2006.01)
*H01F 27/38*    (2006.01)
*H01F 38/14*    (2006.01)
*H02J 7/02*    (2016.01)

(52) U.S. Cl.
CPC ................ *H01F 27/38* (2013.01); *H01F 38/14* (2013.01); *H02J 7/025* (2013.01)

(58) Field of Classification Search
USPC ........... 336/170, 220–222, 180, 186, 83, 147, 336/211, 212
See application file for complete search history.

(56) References Cited

U.S. PATENT DOCUMENTS 2,406,045 A * 8/1946 Stevens ........................ 336/73
2,811,699 A * 10/1957 Whittier ........................ 336/69

(Continued)

FOREIGN PATENT DOCUMENTS

DE    3802062    8/1998
PL    P381975    9/2008

OTHER PUBLICATIONS

Sakamoto H et al :"A Magnetic Coupled Charger With No-Load Protection" IEEE Transactions on Magnetics, IEEE Service Center, New York, NY, US vol. 34, No. 4 Part 01 Jul. 1, 1998, pp. 2057-2059.

*Primary Examiner* — Mangtin Lian
(74) *Attorney, Agent, or Firm* — Mark M. Friedman

(57) ABSTRACT

A contactless energy transfer circuit, comprising a magnetic receiving element (EMO) comprising a reactance receiving element (L4) configured to receive magnetic field energy from an integrated reactance module comprising a magnetic element (EM) and a plurality of coaxial windings of reactance power elements (L1), (L2) . . . (LN), separated from each other by means of magnetic flux conductors (SM) constituting an integral part of the magnetic element (EM), which is configured to concentrate magnetic field lines generated by the reactance power elements (L1), (L2) . . . (LN), wherein the outermost winding of reactance power elements (L2) is situated outside the magnetic element (EM) and the other windings of reactance power elements (L1), (L3) . . . (LN) are situated inside the magnetic element (EM), wherein the magnetic receiving element (EMO) is separated from the magnetic element (EM) by an insulating spacer (I).

3 Claims, 2 Drawing Sheets

(56) References Cited

U.S. PATENT DOCUMENTS

| | | | |
|---|---|---|---|
| 3,423,709 A * | 1/1969 | Lugten | 336/83 |
| 4,507,639 A * | 3/1985 | Trenkler et al. | 336/115 |
| 4,675,638 A * | 6/1987 | Szabo | 336/83 |
| 7,242,275 B2 | 7/2007 | Poniatowski et al. | |
| 7,525,406 B1 | 4/2009 | Cheng | |
| 7,598,839 B1 | 10/2009 | Wedley | |
| 2008/0024259 A1 * | 1/2008 | Chandrasekaran et al. | 336/178 |

* cited by examiner

INTEGRATED REACTANCE MODULE

TECHNICAL FIELD

The present invention relates to an integrated reactance module intended for use in DC/DC resonant converters and particularly to contactless energy transfer circuits enabling safe and sparkless connection of electrical devices.

BACKGROUND ART

Inductive contactless energy transfer systems are particularly suitable for environments where gas or dust ignition hazard occurs, such as mines, fuel stations and chemical laboratories, as well as those environments where the use of direct connections is impracticable, such as implants or rotating components.

Contemporary DC/DC resonant converters comprise a number of inductive elements which, depending on the applied resonant circuit, can additionally be magnetically coupled or magnetically non-coupled. The cylindrical shape of inductive elements is not suited for optimal utilization of mounting surface area. Where a plurality of inductive elements is used, the distances between inductive elements should be increased in order to avoid undesired couplings. In such case integrated inductive elements may advantageously be used.

A prior art inductive module known from the U.S. Pat. No. 7,598,839 comprises N inductors and N+1 core elements. Each magnetic element has a cavity to situate a winding. These magnetic elements are stacked in such a manner that the back of a preceding magnetic element closes the magnetic circuit of a subsequent magnetic element.

A structure described in the U.S. Pat. No. 7,525,406 comprises a plurality of coupling and non-coupling inductive elements and at least one closed magnetic circuit composed of adjacent magnetic elements, which have penetrated grooves for electric current conductors along an X-axis and a Y-axis orthogonal to the X-axis. The current conductors situated along the same axis provide mutual inductance whereas there is no coupling between mutually orthogonal current conductors.

From the U.S. Pat. No. 7,242,275 there is known a variable inductive element immune to high voltage between a control circuit and the controlled inductance. This variable inductor includes two cores of a permeable magnetic material formed in the shape of the letter "E" having three legs, including a centre leg and two outer legs. The main winding is wound around the centre leg of the first core, whereas the control winding is wound around the outer legs of the second core. Both cores are separated by means of a dielectric insulating spacer. The use of an additional magnetic flux conductor is optional. The described variable inductive element is intended for use in voltage converter resonant circuits.

The aforementioned examples illustrate embodiments of integrated reactance elements and an embodiment of a controlled reactance element. These components can be used in typical DC/DC resonant converters implementations. However, the aforementioned integrated reactance elements are not entirely suitable for use in resonant converters that provide contactless energy transfer to a separate receiver. For example, a contactless energy transfer circuit is known from the Polish patent application No. P-381975. This circuit comprises a plurality of reactance elements in its transmitter part and an inductive element including a magnetic element in a portable receiver part. For the purpose of said disconnectable and contactless energy converter it is advisable to develop a specific integrated reactance module, which would include all essential inductive power elements. This module should also ensure reliable operation with open magnetic circuit, optimal energy transfer to a receiver with closed, or partially closed, magnetic circuit, and allow for correction of the resonant frequency changes caused by proximity of an inductive receiving element.

The U.S. Pat. No. 4,675,638 and the German patent application DE3802062A1 present integrated reactance modules, comprising a magnetic element and a plurality of coaxial windings of reactance power elements separated from each other with magnetic flux conductors constituting an integral part of the magnetic element, wherein all the windings of reactance power elements are situated inside the magnetic element In an article "A magnetic coupled charger with no-load protection" by Sakamoto H et al. (IEEE Transactions on Magnetics vol. 34 no. 4, part 01, 1 Jul. 1998), pages 2057-2059, ISSN: 0018-9464) there is presented an integrated reactance module (FIG. 6), comprising a winding of reactance power elements ($N_{M1}$) situated inside a magnetic element and a winding of a control circuit ($NF_2$) situated outside the magnetic element. The winding of a control circuit is not used directly for transmitting power but only for control of the power transmission, therefore it is not a winding of reactance power element.

DISCLOSURE OF THE INVENTION

The integrated reactance module according to the invention has windings of integrated reactance elements situated in a common magnetic element and magnetically isolated and separated from each other by means of magnetic flux conductors being an integral part of the magnetic element. The magnetic element is specifically designed for concentration of magnetic field lines produced by the said reactance elements.

BRIEF DESCRIPTION OF DRAWINGS

The object of the invention is shown in exemplary embodiments in drawings, where.

MODES FOR CARRYING OUT THE INVENTION

Exemplary Embodiment I

Figure 1:
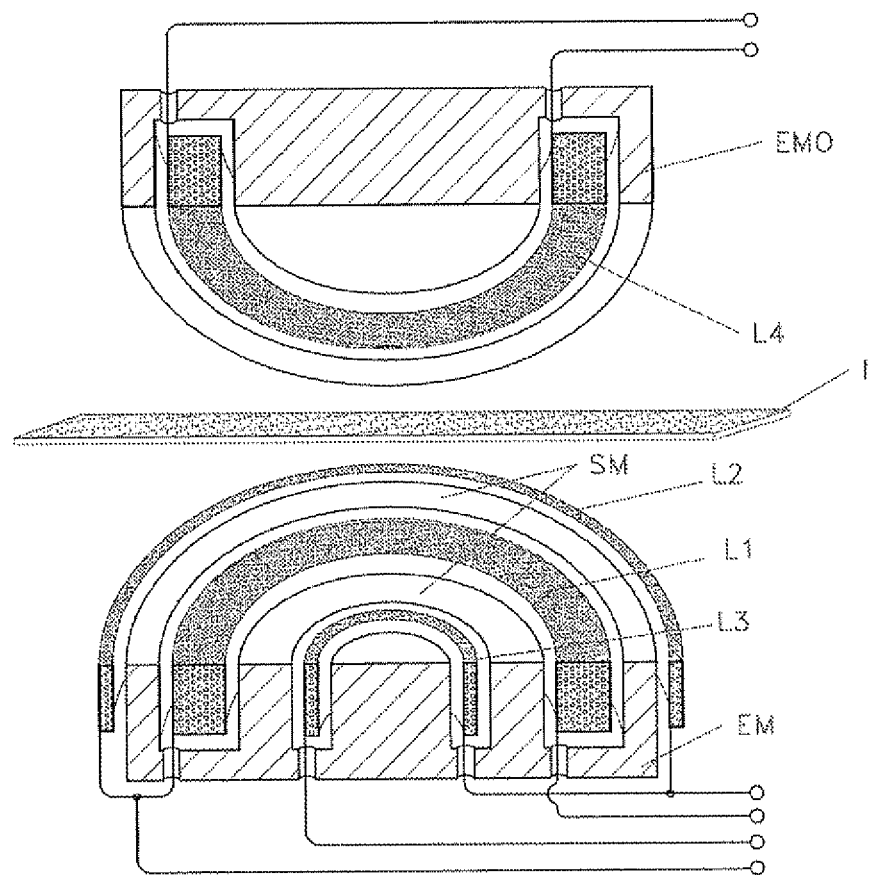
FIG. 1 shows the view of the integrated reactance module and the reactance receiving element.
Figure 2:
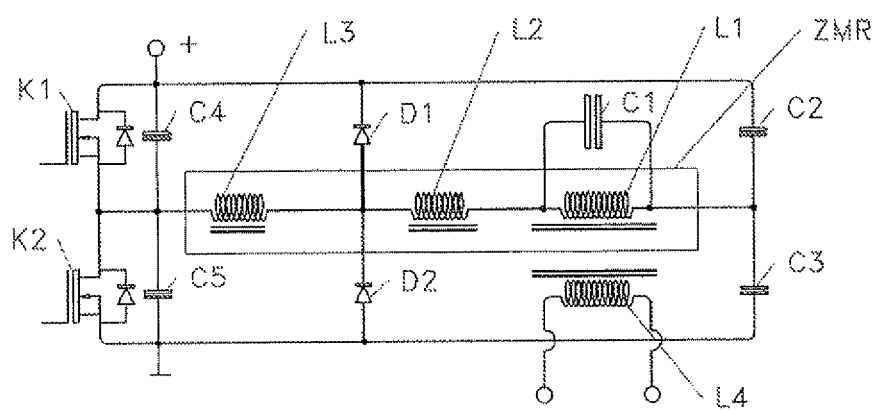
FIG. 2 shows an example of application circuit which utilizes reactance elements of the integrated module shown in FIG. 1.

The integrated reactance module ZMR shown in FIG. 1 comprises reactance elements L1, L2, L3 situated on a magnetic element EM and separated from each other by magnetic flux conductors SM. Such module is applicable to a device for contactless charging of batteries of portable mining equipment. The device for contactless charging of portable mining equipment, shown in FIG. 2, comprises an arrangement of current switches K1, K2, connected with the reactance elements L1, L2, L3 of the integrated reactance module and auxiliary reactance elements C1, C2, C3, C4, C5. The reactance element L1 in connection with the reactance element C1 constitutes the main resonant circuit, wherein the main portion of the energy of the whole circuit is stored. The magnetic element EM provides concentration of magnetic field lines. The magnetic field energy from the neighbourhood of this element can be received by means of the reactance receiving element L4 provided with the magnetic receiving element EMO. Both magnetic elements EM and EMO are separated by means of an insulating spacer I. When the reactance receiving element L4 is brought close, an alternating voltage is induced across its terminals, which after rectification is applied to the battery of portable mining equipment. The reactance elements L2, L3 ensure optimum commutation conditions for the switches K1, K2. The diodes D1, D2 limit the maximum values of voltage and current in the main resonant circuit, thereby ensuring reliable operation in transient states when rapid changes in operating conditions occur. The reactance elements L2 and L3 integrated with the reactance element L1 enable correction of self-resonant frequency of the main resonant circuit.

The integrated reactance module ZMR according to the invention allows energy transfer to the reactance element L4 incorporated within the energy receiver. Owing to the fact that all three reactance power elements L1, L2, L3 are incorporated in a single magnetic element EM, the structure comprising the resonant circuits is compact and the connections between the reactance elements are contained within the module. The integral structure of the integrated reactance elements allows for "parametric" correction of the resonant frequency correction depending on the distance from reactance receiving element. Such correction is particularly advantageous if the commutation circuit operates at a set frequency. Then, in case of connecting the load by bringing close the reactance receiving element L4, the self-resonant frequency of the main resonant circuit will be tuned towards higher frequencies. Since the reactance receiving element L4 is provided with the magnetic element EMO, its approaching to the integrated reactance module ZMR changes the reluctances of the other reactance elements L2, L3 and, consequently, their reactances will increase. Since both reactance elements L2, L3 are connected with the main resonant circuit, a partial correction of self-resonant frequency of the main resonant circuit is possible. This property allows for construction of simple and highly reliable converters without the need for complex systems of output parameters control.

Exemplary Embodiment II

Figure 3:
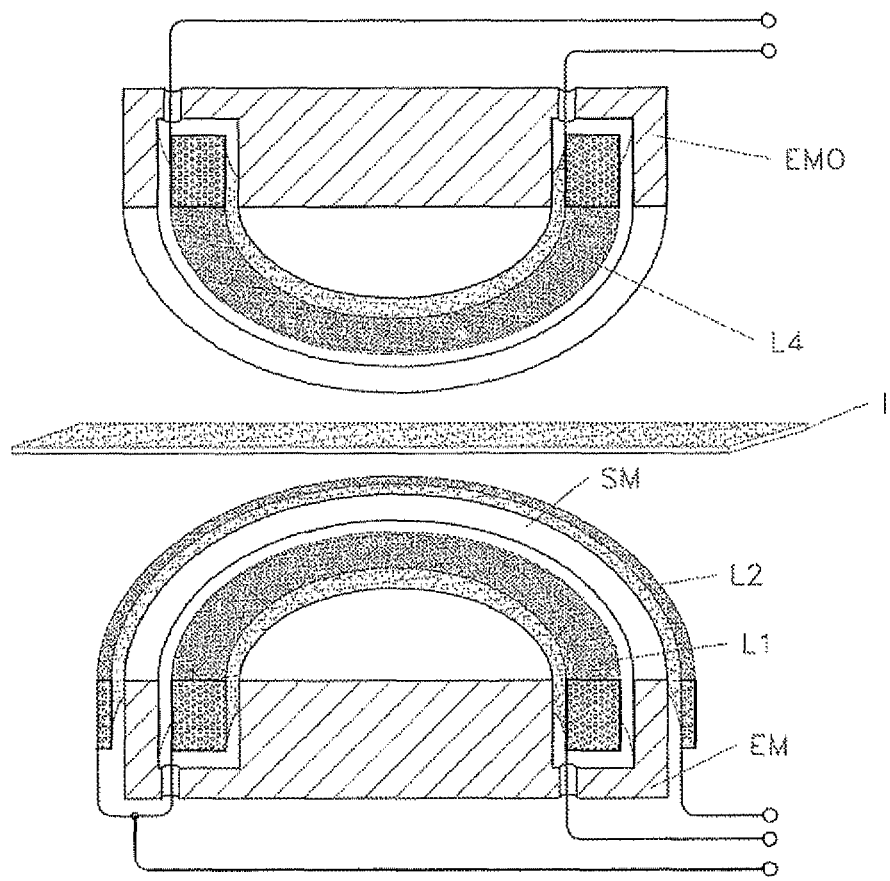
FIG. 3 shows a simplified version of the integrated reactance module.
Figure 4:
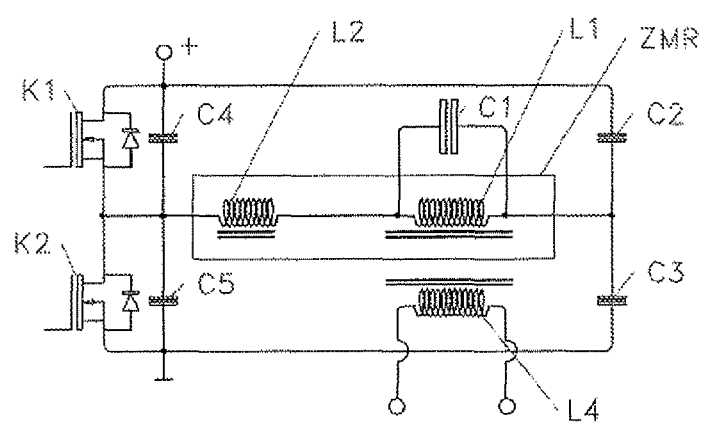
FIG. 4 shows the proposed application circuit of the simplified reactance module according to FIG. 3.

A simplified version of the integrated reactance module ZMR, shown in FIG. 3, is applicable to a device for contactless charging of batteries of miner's lamps. The module comprises reactance elements L1, L2 situated on the magnetic element EM and separated from each other by means of the magnetic flux conductor SM. The device for contactless charging of batteries of miner's lamps, as shown in FIG. 4, includes an arrangement of current switches K1, K2, connected with reactance elements L1, L2, of the integrated reactance module and auxiliary reactance elements C1, C2, C3, C4, C5. The reactance element L1, in connection with the reactance element C1 constitutes the main resonant circuit wherein the main portion of the energy of the whole circuit is stored. The magnetic element EM provides concentration of magnetic flux. The magnetic field energy from the neighbourhood of this element can be received by means of the reactance receiving element L4 provided with the magnetic receiving element EMO. Both magnetic elements EM and EMO are separated by means of an insulating spacer I. As a result of nearing the reactance receiving element L4, an alternating voltage is induced across its terminals, which after rectification is applied to the battery of the miner's lamp.

The invention claimed is:

1. A contactless energy transfer circuit, comprising a magnetic receiving element (EMO) comprising a reactance receiving element (L4) configured to receive magnetic field energy from an integrated reactance module comprising a magnetic element (EM) and a plurality of coaxial windings of reactance power elements (L1), (L2) . . . (LN), separated from each other by means of magnetic flux conductors (SM) constituting an integral part of the magnetic element (EM), which is configured to concentrate magnetic field lines generated by the reactance power elements (L1), (L2) . . . (LN), wherein the outermost winding of reactance power elements (L2) is situated outside the magnetic element (EM) and the other windings of reactance power elements (L1), (L3) (LN) are situated inside the magnetic element (EM), wherein the magnetic receiving element (EMO) is separated from the magnetic element (EM) by an insulating spacer (I).

2. The contactless energy transfer circuit according to claim 1, wherein the outermost winding of reactance power elements (L2) is connected in series with a capacitive reactance power element (C2, C3) and at least one other winding of reactance power elements (L1), said other winding of reactance power elements being connected in parallel with another capacitive reactance power element (C1) for constituting a main resonant circuit, in which the main portion of the energy of the whole circuit is stored, thereby forming a series-parallel LCLC-type tank circuit.

3. The contactless energy transfer circuit according to claim 2, wherein the series-parallel LCLC-type tank circuit is connected in series to a half-bridge inverter comprising a pair of current switches (K1, K2) connected in parallel with a pair of reactance power elements (C4, C5).

* * * * *